Jan. 20, 1953  E. NASSIMBENE  2,625,825

COG TYPE V BELT

Filed Oct. 19, 1950

Inventor
ERNEST NASSIMBENE
By Anderson & Muller
Attorneys

Patented Jan. 20, 1953

2,625,828

UNITED STATES PATENT OFFICE 2,625,828

COG TYPE V BELT

Ernest Nassimbene, Denver, Colo., assignor to The Gates Rubber Company, Denver, Colo., a corporation of Colorado Application October 19, 1950, Serial No. 190,998

3 Claims. (Cl. 74—233)

This invention relates to power transmission belts and more particularly to improvements in cog-type V-belts.

One of the objects of the invention is to provide a cog-type V-belt in which cracking of the belt in the regions between the cogs is minimized, thereby increasing the useful life of the belt.

Another object is to minimize belt cracking by novel wall construction connecting adjacent cogs.

Further objects, advantages, and salient features will become more apparent from the description to follow, the appended claims, and the accompanying drawing, in which:

Figure 1:
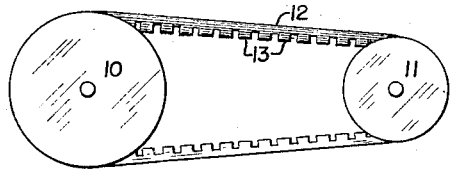
Figure 1 is a diagrammatic side elevation of a belt transmission system employing the belt which constitutes the subject of the invention.

Referring to the drawing, Figure 1 illustrates any conventional V-pulleys 10, 11 which transmit power, one to the other, by a belt 12, this being of the so-called cog-type having a plurality of spaced cogs 13 thereon.

Figure 3:
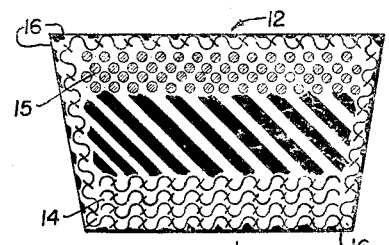
Figure 3 is a section taken on line 3—3, Figure 2.
Figure 2:
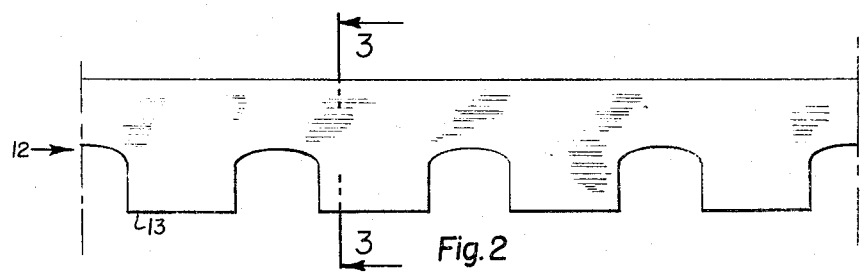
Figure 2 is an enlarged fragmentary side elevation of the belt shown in Figure 1.

The internal construction of belt 12 is conventional, and as exemplary only, has been shown in Figure 3 with rubberized reinforcing fabric layers 14, a tension cord section 15, and a fabric cover 16, the parts all being vulcanized together as well understood in the art.

Figures 7, 8:
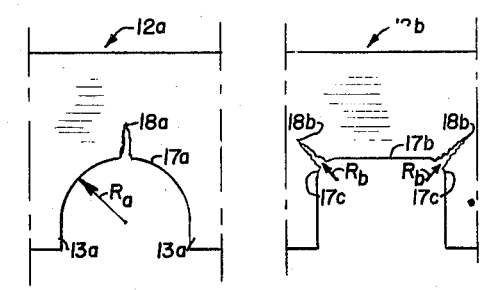
Figure 7 is a fragmentary side elevation of one form of prior art belt.
Figure 8 is a side elevation of another form of prior art belt.

For a better understanding of the invention, reference is now made to Figures 7 and 8. Figure 7 illustrates one form of prior art cog belt 12a wherein a semi-circular wall 17a of radius Ra extends between adjacent cogs 13a. This type of belt usually commences to crack approximately midway between cogs, as shown by crack 18a. Figure 8 illustrates another form of prior art cog belt 12b wherein the wall which extends between adjacent cogs comprises a flat or planar portion 17b and arcuate end portions 17c, of relatively small radius Rb. This type of belt usually commences to crack in the fillets formed by portions 17c, as shown by cracks 18b. It has been found that the cracking of the belts just referred to can be minimized and the life of a belt thus materially increased by the form of wall construction of this invention, which will now be described and distinguished from the prior art.

Figure 5:
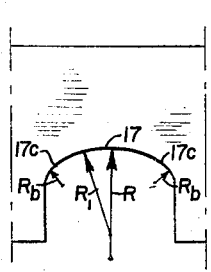
Figures 4, 5 and 6 are enlarged fragmentary side elevations of various forms of the belt shown in Figure 2.
Figure 4:
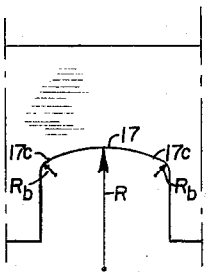
Figure 6:
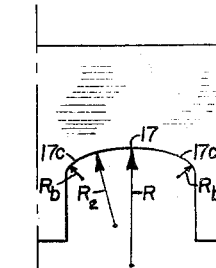
Figure 9:
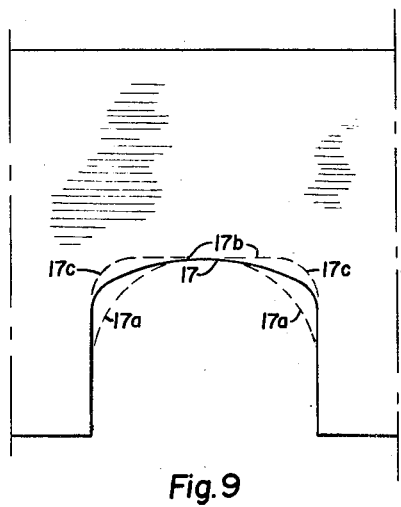
Figure 9 is an enlarged side elevation of Figures 7 and 8, and any of Figures 4, 5 or 6, superposed upon each other.

Referring to Figures 4, 5 and 6, it will be observed that the fillets are much the same as fillets 17c of Figure 8, but wall 17 between the fillets is arched upwardly, rather than being planar, as in Figure 8. It also differs from Figure 7 in that it is of larger radius of curvature R than radius Ra. Figure 9 illustrates the three shapes so far described superposed upon each other and makes apparent their differences.

It has been found that the curvature of wall 17 may vary somewhat and produce optimum results so long as its shape remains within certain general limits. In Figure 4 it is shown as a simple circular arc of relatively large radius R having its center on a line perpendicular to the longitudinal axis of the belt, the line intersecting the central portion of wall 17, the ends of the arc joining the arcuate portions defined by relatively small radius Rb, Rb.

In Figure 5 wall 17 is similar to that shown in Figure 4 except that the radius of curvature decreases, as shown by $R^1$, as the curve approaches the portions defined by Rb, Rb.

Figure 6 is similar to Figure 5 in that the radius of curvature also decreases, but the center of curvature may be at points other than along the central transverse belt axis between cogs.

A special form of curve between cogs within the purview of the invention and which may be defined with mathematical exactness is a semi-ellipse having a relatively large major axis and a relatively small minor axis, the major axis being parallel to the longitudinal axis of the belt.

Belts built in accordance with this invention will not commence to crack at any particular point such as shown at 18a or 18b of Figures 7 and 8, which indicates that the upwardly arched portion 17 minimizes localized stress concentrations and more uniformly distributes the stresses on the belt cover and core of the belt throughout the length of the wall between cogs as the belt flexes in passing over the pulleys.

Various modifications within the purview of the invention will become apparent to those skilled in the art, and the specific constructions illustrated are to be considered as exemplary only and the invention not limited thereto except as defined by the scope of the appended claims.

Having described the invention, what is claimed as new is:

1. In a V-belt of the type having a plurality of spaced cogs disposed on the narrow side thereof, each cog having an exposed end surface adapted to face a V-pulley, the belt being constructed of rubber-like material provided with a reinforced tension section in the wider side thereof, the improvement which comprises; a wall disposed between adjacent cogs extending transversely between the pulley engaging sides of the belt, said wall having a concave central portion joined at its ends to the adjacent cogs by concave end portions, the radius of curvature of the central portion at all portions thereof being greater than the radius of curvature of the end portions.

2. In a V-belt of the type having a plurality of spaced cogs disposed on the narrow side thereof, each cog having an exposed end surface adapted to face a V-pulley, the belt being constructed of rubber-like material provided with a reinforced tension section in the wider side thereof, adjacent cogs having a wall disposed therebetween extending transversely between the pulley engaging sides of the belt, said wall having a central portion joined at its ends to the adjacent cogs by concave end portions, the improvement wherein said central portion is concave and its radius of curvature at all portions between the ends thereof is greater than the radius of curvature of said end portions.

3. In a V-belt of the type having a plurality of spaced cogs disposed on the narrow side thereof, each cog having an exposed end surface adapted to face a V-pulley, the belt being constructed of rubber-like material provided with a reinforced tension section in the wider side thereof, adjacent cogs having a wall disposed therebetween extending transversely between the pulley engaging sides of the belt, said wall having a central portion joined at its ends to the adjacent cogs by concave end portions, said end portions being subjected to stress concentrations under belt flexure tending to crack the belt thereat, the improvement wherein said central portion is concave and of greater radius of curvature than said end portions and of a shape adapted to reduce said stress concentrations.

ERNEST NASSIMBENE.

REFERENCES CITED

The following references are of record in the file of this patent:

UNITED STATES PATENTS

| Number | Name | Date |
|---|---|---|
| 2,065,180 | Freedlander | Dec. 22, 1936 |

FOREIGN PATENTS

| Number | Country | Date |
|---|---|---|
| 14,174 of 1904 | Great Britain | Apr. 27, 1905 |
| 881,283 | France | Jan. 22, 1943 |